July 5, 1938.  C. D. BRIDDELL  2,123,094
ATTACHMENT FOR ANIMAL TRAPS
Filed May 6, 1936  2 Sheets-Sheet 1
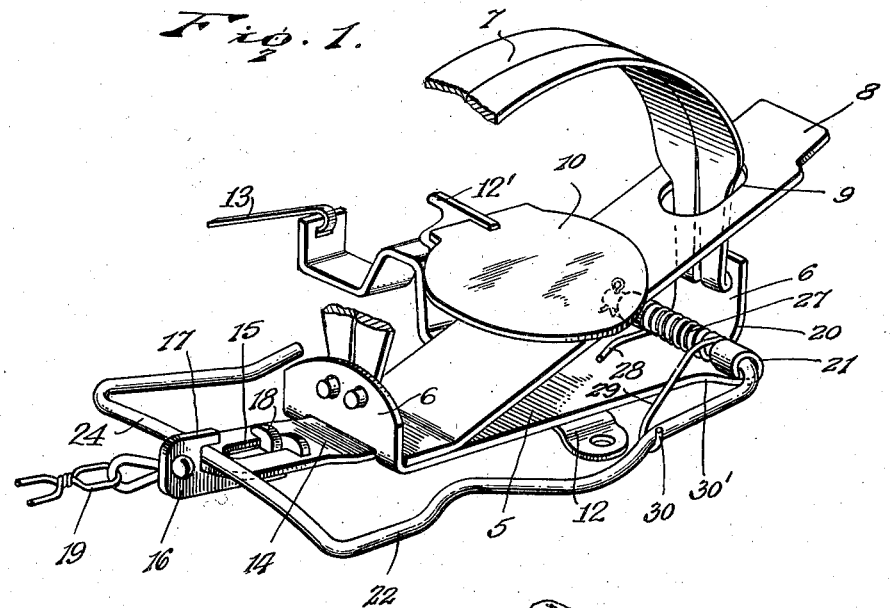
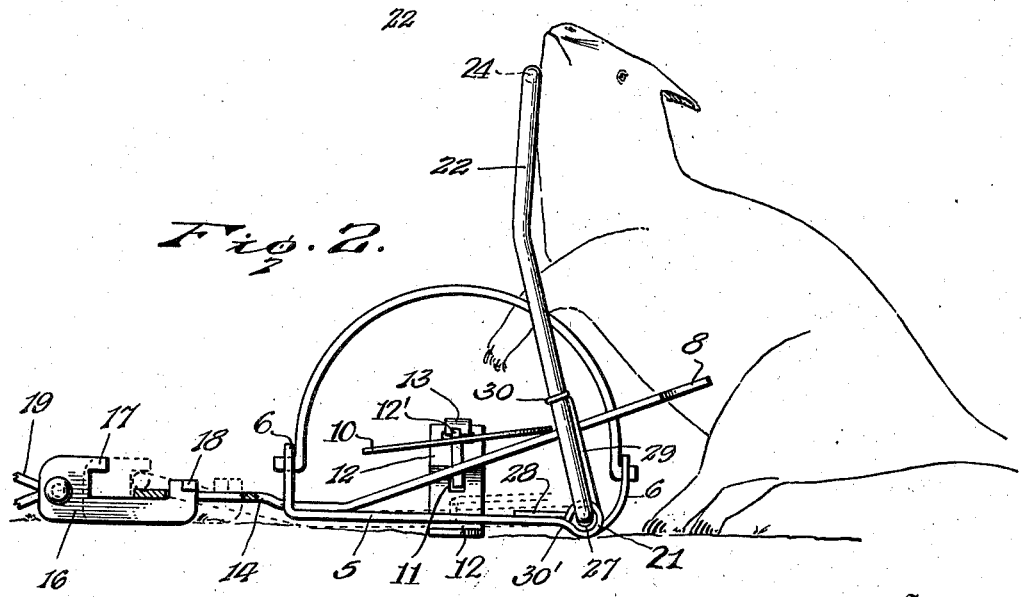
Inventor
C. D. Briddell.
By Lacey & Lacey,
Attorneys July 5, 1938.  C. D. BRIDDELL  2,123,094
ATTACHMENT FOR ANIMAL TRAPS
Filed May 6, 1936  2 Sheets-Sheet 2
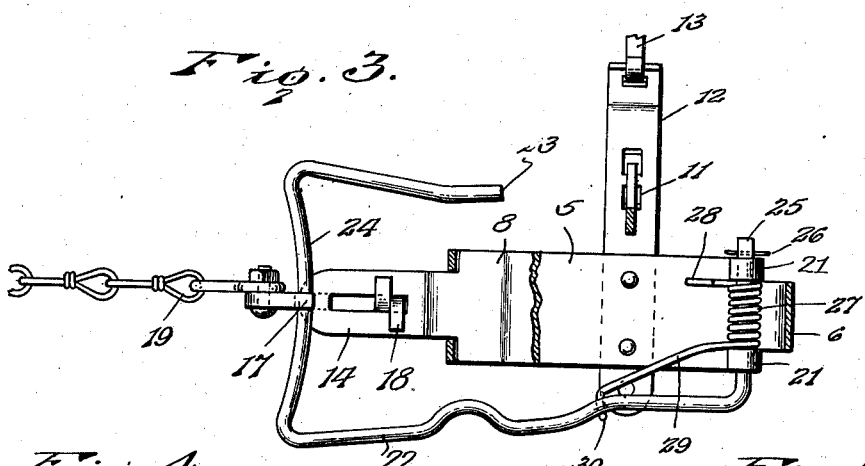
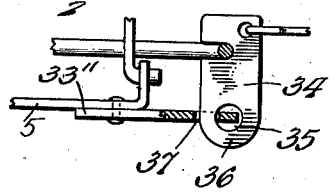
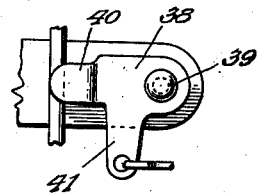
Inventor
C. D. Briddell.
By Lacey & Lacey, Attorneys Patented July 5, 1938

2,123,094

UNITED STATES PATENT OFFICE 2,123,094

ATTACHMENT FOR ANIMAL TRAPS

Charles D. Briddell, Crisfield, Md.

Application May 6, 1936, Serial No. 78,251

3 Claims. (Cl. 43—90)

This invention relates to animal traps and more particularly to a novel guard or striker bar for preventing an animal from escaping after it has been caught in the trap.

A further object of the invention is to provide a guard or striker bar of simple and inexpensive construction capable of being quickly attached to any standard make of jaw trap without necessitating any material structural change therein and which will effectually prevent an animal caught between the jaws of the trap from twisting or gnawing off a leg or other impaled portion of its body and escaping from the trap.

A further object is to provide an attachment for animal traps which functions only after an animal has been caught and attempts to release itself by pulling on the trap.

A further object is to provide an attachment of the class described comprising a spring actuated loop or yoke having one end thereof pivotally mounted on the trap and its opposite end normally held in depressed or inoperative position by a trigger mechanism connected with the anchoring chain of the trap so that when a trapped animal exerts a pull on the trap, the trigger mechanism will be actuated to release the yoke and force the head of the animal away from the impaling jaws.

A still further object of the invention is generally to improve this class of devices so as to increase their utility, durability and efficiency.

In the accompanying drawings forming a part of this specification and in which similar numerals of reference indicate corresponding parts in all the figures of the drawings, Figure 1 is a perspective view, with parts broken away for clearness of illustration, of an animal trap provided with a guard or striker bar embodying the present invention, the jaws being shown in closed position and the guard or striker bar ready to be released as soon as a longitudinal pull is exerted on the body of the trap.

Figure 2 is a side elevation showing the guard or striker bar in operative position holding the head of the animal away from the trap.

Figure 3 is a top plan view of Figure 1 partly in section.

Figure 4 is a side elevation partly in section showing a modified form of trigger mechanism of the yoke.

Figure 5 is a top plan view showing another form of trigger.

The improved guard or striker bar forming the subject-matter of the present invention may be used in connection with any type of standard jaw trap, and by way of illustration is shown in Figure 1 in connection with a conventional form of trap, in which 5 designates a base spring plate having oppositely disposed upstanding ears 6 in which are pivotally mounted impaling jaws, indicated at 7. Secured to one end of the base plate 5 is the usual spring bar 8 having an opening 9 formed therein through which the jaws 7 pass, and disposed above the bar 8 is a trip pan 10 pivotally mounted, at 11, on a transverse bar 12 and having a tooth 12' adapted to engage the end of a pivoted trigger 13 for releasably holding the pan in a set position in the same manner shown in Figure 5 of the prior patent, No. 1,603,706, issued October 19, 1926. One end of the spring bar 8 is extended longitudinally through the base plate 5 and beyond the jaws 7 to form a reduced extension 14 provided with a longitudinal slot 15, as best shown in Figure 1 of the drawings. Slidably mounted on the lower surface of the extension 14 is a trigger or latch 16 having its forward portion provided with an overhanging hook 17 and its rear portion extended upwardly through the slot 15 and thence bent laterally to form retaining lugs 18 for holding and guiding the latch on the reduced extension of the spring bar. Secured to the free end of the sliding latch 16 is one end of a chain or similar flexible element 19, the opposite end of which may be secured to a stake, tree, or other suitable support for the purpose of anchoring the trap in any desired position.

The forward end of the base plate 5 is cut away, at 20, and the metal at said cut away portions bent or curved upon itself to form spaced eyes 21 which constitute bearings for the guard or striker bar, indicated at 22. The guard or striker bar 22 is preferably in the form of a loop, one side of which is cut away, as indicated at 23, to permit the loop to clear the pan 10 when said loop is swung to a set position in engagement with the latch or trigger 16. The forward or free end of the guard 22 is preferably wider than its rear end and, if desired, may be slightly concave, as indicated at 24, so that when the guard is released, the curved portion of said guard will strike the head or neck of the animal and force said animal rearwardly so that it cannot gnaw or chew off an impaled leg, as best shown in Figure 2 of the drawings. The metal constituting the guard or striker bar 22 is bent inwardly at the rear end thereof to form a transverse pin 25 which fits between the spaced eyes 21 and is retained in position on the base plate 5 by means of a cotter pin or other suitable fastening device, indicated at 26. Surrounding the pin 25 and interposed between the bearing eyes 21 is a coil spring 27, one end of which bears against the base plate 5, as indicated at 28, while the opposite end thereof is bent to form an arm 29 terminating in a hook 30 which fits under the metal constituting the guard, as best shown in Figure 3 of the drawings. The base plate at the eyes 21 is preferably curved downwardly, as indicated at 30', to provide a seat for the coil spring 27 and to allow the free end of the spring bar 8 to be depressed sufficiently to permit proper setting of the trap.

In operation, the free end of the guard or yoke 22 is swung rearwardly against the tension of the spring 27 and the concave end of the guard fitted under the hook 17 of the latch 16, after which the trap is set in the usual manner by depressing the free end of the spring bar 8 and moving the jaws 7 laterally, and in which position they will be held by means of the pan 10 and trigger 11 in the usual manner. Should an animal tread upon the pan 10 or attempt to eat bait deposited thereon, the jaws 7 will be released and automatically grip a leg or other portion of the animal in the usual manner. Should the animal attempt to escape from the trap by jerking on its impaled leg, the pull on the trap will automatically release the hook 17 from engagement with the concave end of the guard or striker bar, thus releasing the striker bar and causing the spring 27 to automatically move the guard rearwardly in contact with the animal, thereby forcing the head of the animal away from the trap and preventing the animal from gnawing or twisting off its leg in an effort to free itself from the trap. In traps of the jaw type it often happens that after an animal is trapped, a crafty animal will spin or twist itself around the trap or attempt to gnaw through its leg or other impaled portion so as to escape from the trap and my improved guard or striker bar will effectually frustrate any such attempt on the part of the animal so that after the animal is once caught between the jaws of the trap, there is no possibility of escape.

If desired, instead of having the trigger or latch 16 slidably mounted on the extension of the spring bar 8, a plate 33'' may be bolted, welded, or otherwise fastened to the plate 5 for supporting a pivoted trigger 34, as best shown in Figure 4 of the drawings. When a pivoted trigger is used, the lower end thereof will be provided with an opening 35 forming a loop 36 which extends through an opening 37 in the plate 33''. If desired, a trigger of the type shown in Figure 5 may be employed. In this form of the device, the trigger consists of a flat plate 38 having one end thereof pivotally mounted, at 39, on the extension of the plate 5 and its other end provided with an offset lip 40 adapted to engage the concave end of the guard or striker bar. The plate 38 is formed with a laterally extending ear 41 to which is secured one end of an anchoring chain so that when an animal exerts a longitudinal pull on the trap, the plate 38 constituting the trigger will be swung laterally on its pivot 39 until the lip 40 clears the adjacent end of the yoke, thus permitting the controlling spring to actuate the yoke and strike the animal after it is trapped.

Having thus described the invention, what is claimed as new is:

1. An animal trap comprising a base having its opposite ends directed upwardly to provide ears, one of said ears being narrower than the other ear, eyes located at opposite sides of the bottom of the upturned narrow ear and together with the portion of the base across the bottom of the narrow ear being depressed and forming a bearing, jaws pivoted at their ends to said ears, a spring for closing said jaws, a latch for engaging one jaw and holding the jaws open, a trip pan for engaging said latch and securing the same with the jaws open, a U-shaped guard having one arm longer than the other and formed with a laterally extending pivot pin journaled through the bearing, said guard extending from its pivoted end towards and beyond the ear at the other end of the base when in a lowered position, a spring for urging the guard upwardly from a lowered position coiled about the pivot pin between the eyes and having portions engaging the base and the elongated arm of the guard, and a latch for engaging the free end portion of said guard and releasably holding the guard in a lowered set position.

2. An animal trap comprising a base having upstanding ears at its ends, jaws pivoted at their ends to said ears for swinging movement into and out of a closed position, a latch for holding the jaws open, a trip pan for engaging said latch and releasably securing the same with the jaws open, a spring for closing said jaws extending longitudinally of the jaws and having an anchoring tongue at one end passing through one ear and projecting outwardly therefrom, a guard straddling said jaws and pivotally mounted for swinging movement longitudinally of the jaws from a raised position to a lowered position disposing a portion across said tongue, a spring yieldably holding the guard raised, and a latch carried by said tongue and movable into and out of position to engage the overlying portion of the guard and secure the guard in its lowered position.

3. An animal trap comprising a base having upstanding ears at its ends, jaws pivoted at their ends to said ears for swinging movement into and out of a closed position, a latch for holding the jaws open, a trip pan for engaging said latch and releasably securing the same with the jaws open, a spring for closing said jaws extending longitudinally of the jaws and having an anchoring tongue at one end passing through one ear and projecting outwardly therefrom, a guard straddling said jaws and pivotally mounted for swinging movement longitudinally of the jaws from a raised position to a lowered position disposing a portion across said tongue, a spring yieldably holding the guard raised, the tongue being formed with a slot, a latch extending longitudinally of said tongue and having a bill overlying the tongue and anchoring means loosely engaged through the slot and mounting the latch for sliding movement longitudinally of the tongue into and out of position for engagement of the bill with the guard to releasably hold the guard in a lowered set position, and a shackle connected with the outer end portion of said latch.

CHARLES D. BRIDDELL.